United States Patent [19]

Pagel et al.

[11] Patent Number: 4,768,610
[45] Date of Patent: Sep. 6, 1988

[54] DEVICE ON A MOTOR VEHICLE

[75] Inventors: Ernst-Olay Pagel, Bohmfeld; Heiko Barske, Ingolstadt; Fritz Naumann, Stammham, all of Fed. Rep. of Germany

[73] Assignee: Audi AG, Ingolstadt, Fed. Rep. of Germany

[21] Appl. No.: 65,817

[22] Filed: Jun. 24, 1987

[30] Foreign Application Priority Data

Jun. 25, 1986 [DE] Fed. Rep. of Germany ....... 3621247

[51] Int. Cl.$^4$ ............................................. B60K 41/28
[52] U.S. Cl. .................................... 180/271; 192/4 A
[58] Field of Search ........................ 180/271; 192/4 A

[56] References Cited

U.S. PATENT DOCUMENTS

| 4,096,930 | 6/1978 | Viscardi | 180/271 |
| 4,187,935 | 2/1980 | O'Hern | 180/271 |
| 4,246,989 | 1/1987 | Kohler | 180/271 |

FOREIGN PATENT DOCUMENTS 3238196 4/1984 Fed. Rep. of Germany.

Primary Examiner—Kenneth R. Rice
Attorney, Agent, or Firm—Reed Smith Shaw & McClay

[57] ABSTRACT

In a device on a motor vehicle having a brake and brake operating element, a drive assembly and a drive power source with an automatic transmission, a power control element for the drive power source, and a selector mechanism for shifting the automatic transmission from a neutral position and/or a park position into one or more forward or reverse drive positions, means acting on the drive power source and/or the power control element are provided, which means are connected to the brake operating element and the selector mechanism and which disable power output from the drive power source on engagement of a drive position from the N and/or P position unless the brake of the vehicle has been applied.

13 Claims, 3 Drawing Sheets

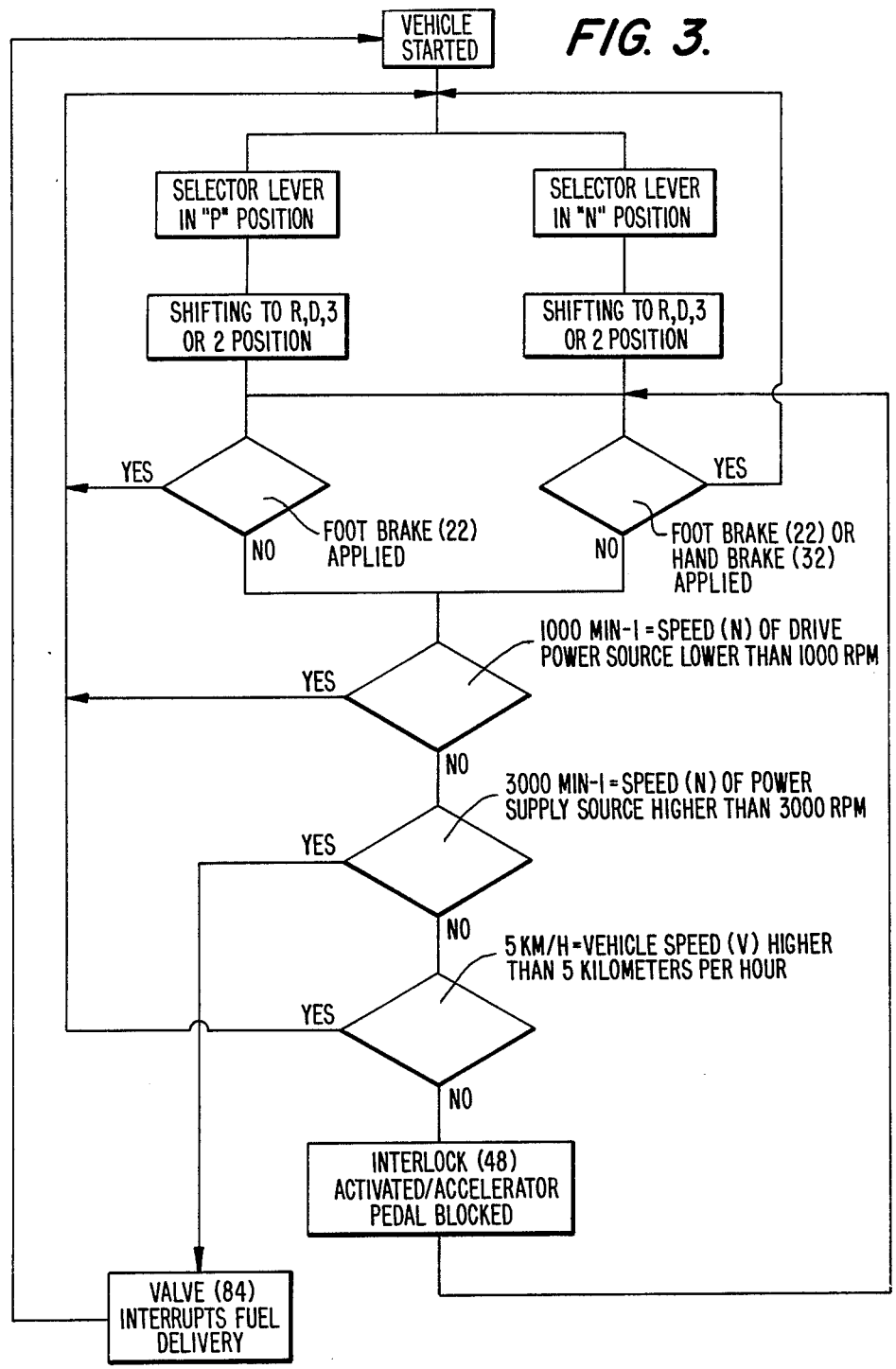

DEVICE ON A MOTOR VEHICLE

BACKGROUND OF THE INVENTION

The invention relates to a device on a motor vehicle with a brake and brake operating element, a drive assembly with a drive power source and an automatic transmission, a power control element for the drive power source, and a selector lever mechanism for shifting the automatic transmission only after the brake has been operated. A locking mechanism is integrated with the throttle to disable the power delivery system unless the brake has been operated.

In motor vehicles with automatic transmissions and without clutch pedals, inexperienced persons in particular or ones familiar with a vehicle having a gearshift mechanism and clutch pedal experience the disconcerting sensation of slow or abrupt forward or rearward movement of the vehicle immediately after a speed range is entered. This phenomenon is observed especially in motor vehicles having hydrodynamic torque converters between the internal combustion engine and transmission and also when the idling speed has been set too high or the hot running speed is high. If a speed range is entered when space is cramped (as, for example in a garage or with the vehicle parked between two other vehicles) and the operator fails to pay full attention, he is surprised by the abrupt, unexpected starting of the vehicle and may find himself in a stress situation in which wrong action may be taken. Hence the operating instructions of such vehicles recommend that the operating brake of the vehicle (foot brake) be applied before a speed range is engaged.

In addition, DE-OS (German Patent Disclosure) No. 32 38 196 discloses a device in which an actuator for the braking system of a vehicle is operated automatically if the speed of travel is below a boundary value near zero and if the brake pedal and accelerator pedal have not been operated. The automatic braking is cancelled when the accelerator pedal and/or brake pedal is operated. Aside from the high engineering cost involved in intervention (automatic braking) in the braking system of the vehicle, the situation described in the foregoing may not be eliminated, inasmuch as the vehicle nevertheless starts out abruptly when the accelerator pedal is operated, because of the automatic release of the brake.

The object of the invention is to employ relatively simple means to avoid a stress situation or abrupt starting of a vehicle when a gear speed range is entered from the neutral position of the transmission, without action by the operator.

Features of the invention are described herein often overcome many of the deficiencies noted above. In the invention, means that act directly on the drive power source or on the power control element, such as the accelerator pedal or its linkage, are connected to the brake operating system and the selector mechanism. These means are so designed that, when a gear speed is engaged from the neutral position or the park position of the transmission, the power output of the internal combustion engine is disabled if the brake of the vehicle has not been applied. Disabling the power output means that the internal combustion engine is either switched off or its idling speed position blocked. As soon as the brake of the vehicle, and the foot brake in particular, has been applied, the means are deactivated and the vehicle may be put in gear or accelerated. As a result of this measure the operator is forced to apply the brake before the vehicle starts out, so that uncontrolled starting is precluded. Provided that the starting torque or creep speed torque is high enough, the vehicle can now be driven or maneuvered, if necessary with an accuracy of centimeters, by varying the brake pressure with the brake actuating element or brake pedal. Only if the available creep speed torque is not high enough does the operator shift his foot from the brake pedal to the accelerator pedal.

The means for disabling the power output may comprise either a valve for interrupting the delivery of fuel, an interlock device blocking the power control element in a suitable position, or, in the case of a throttle-controlled internal combustion engine as drive power source, a second throttle valve in the intake manifold. The latter option is of interest especially if the vehicle already has a second throttle valve as a component of a drive slip regulation system. The effect claimed for the invention can be achieved in this case without great additional expense by providing a suitable logical switching circuit in the control electronics of the drive slip regulation system.

On engagement of a gear speed from the neutral position of the automatic transmission, in particular, it may be advantageous for the means of disabling the power output of the drive power source also to be deactivatable by the hand brake. If desired, both brakes (foot brake and hand brake) may be included in the control system claimed for the invention, so that the vehicle is braked each time that a gear speed is engaged.

In another embodiment, a speed detection system is employed to disable the power source at a preselected vehicle speed. This insures that, with the vehicle in motion and in the event of any unintentional shifting of the selector mechanism into the neutral position followed by reshifting into a forward drive position, there is no need for braking first to permit immediate power output from the internal combustion engine or immediate reacceleration.

In addition, an engine speed detection mechanism may be provided to deactivate the means for disabling the power output at a low speed of the drive power source at which creep speed torque is hardly to be expected, independently of operation of the brake, or, if the speed of the drive power source is too high, as for example because of a defect in the power control element, switches off the drive power source (for example, by interrupting fuel delivery, or the ignition in the case of positive-ignition internal combustion engines).

The above has been a brief discussion of certain deficiencies in the prior art and advantages of the invention. Other advantages will be appreciated from the detailed discussion of the preferred embodiment which follows.

BRIEF DESCRIPTION OF THE DRAWINGS

FIG. 3 shows a logic system for a microprocessor to control an interlock and a fuel shut-off valve.

DETAILED DESCRIPTION OF THE PREFERRED EMBODIMENT

Figure 1:
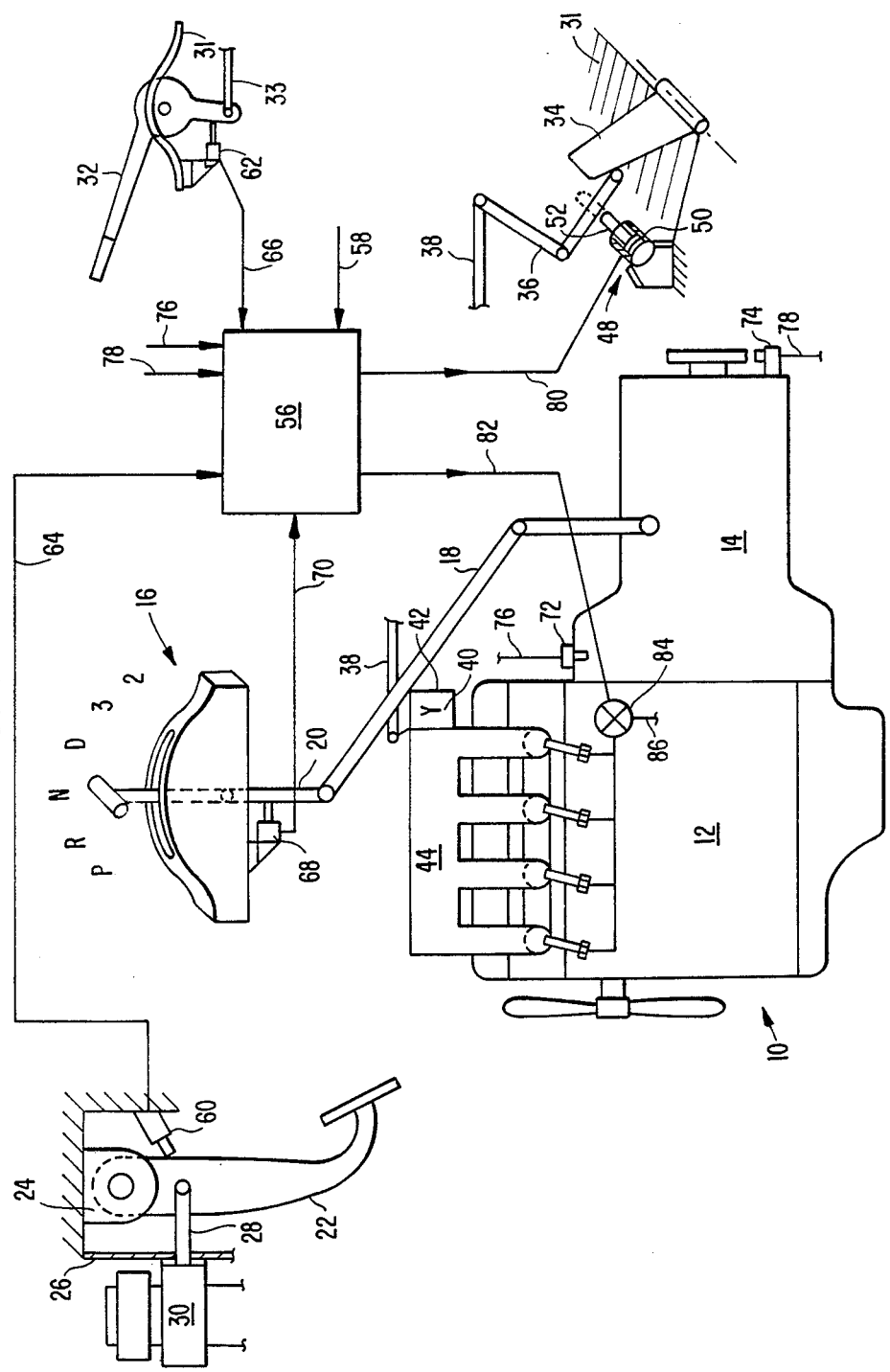
FIG. 1 is a schematic diagram of the invention in a motor vehicle having a foot brake and hand brake, a selector mechanism for the automatic transmission, and an accelerator pedal as power control element.

In FIG. 1, drive assembly 10 that is made up of an internal combustion engine 12 as drive power source and an automatic transmission 14. The automatic transmission may be of prior-art design, as for example one with a hydrodynamic torque converter and several planetary gear assemblies which are engaged by means of multiple-disk clutches and brakes. To activate this circuit a selector mechanism 16 is provided which is connected to the automatic transmission 14 by way of linkage 18. The selector lever 20 of the selector mechanism 16 may be shifted into the positions N=neutral, P=park, and R for reverse gear, as well as D,3,2 as forward drive positions. When the selector is in the P and N positions, force flow from the internal combustion engine 12 to the driven wheels of the vehicle (not shown) is interrupted.

There is shown as part of a hydraulic service brake of a vehicle a brake pedal 22 which is pivotably mounted on a console 24. The console 24 is fastened to the dashboard 26 of the vehicle, which dashboard is merely indicated here. There is connected to the brake pedal 22 by way of a linkage 28 a hydraulic master brake cylinder 30, by way of which hydraulic pressure can be generated by a prior-art method in the wheel brakes (not shown) of the vehicle.

In addition, the vehicle is outfitted with a mechanical hand brake which comprises a hand brake lever 32 pivotably mounted on the floor 31 of the vehicle. The hand brake lever 32 operates by a prior-art method, by way of cable lines 33, on elements of the wheel brakes operating independently of the hydraulic brake.

The power control element or accelerator pedal 34, also pivotably mounted on the floor 31 of the vehicle, is connected by way of a linkage 36 and a linkage 38 (only partly shown) to a throttle valve 40, which throttle valve 40 is mounted in a section 42 of an intake pipe 44. The throughput of combustion air is controlled by means of the throttle valve as a function of the desired power of the internal combustion engine. Fuel is delivered to the internal combustion engine by way of an injection mechanism (not shown) whose injection nozzles 46 inject fuel into the intake pipe 44.

There is mounted on the shift lever 36 an electromagnetic interlock 48 comprising a housing 50 fastened on the floor 31 of the vehicle with an electric winding (not shown) and a relocatable armature element 52. A spring provided in the interlock holds the armature element 52 in the unenergized state in a position releasing the linkage 36 or the accelerator pedal 34.

The interlock 48 is connected to an electronic control unit 56 which is connected by way of a conductor 58 to the voltage supply of the vehicle power supply system. In addition, an electric switch 60, 62 is provided both on the brake pedal 22 and on the hand brake lever 32, said switch emitting a signal by way of a conductor 64, 66 to the control unit 56 when the foot brake or the hand brake of the vehicle has been applied. Another electric switch 68 is provided on the selector mechanism 16, said switch emitting a signal by way of a conductor 70 to indicate the current position of the selector lever 20.

There are also mounted on the drive assembly 10 an engine speed sensor 72 and a vehicle speed sensor 74 which emit signals to the electronic control unit 56 by way of pertinent conductors 76, 78 in proportion to the speed of revolution of the internal combustion engine or the speed of travel of the motor vehicle. As a function of the input data, the electronic control unit 56 controls both the interlock 48 by way of the conductor 80, and also, by way of another conductor 82 a shutoff valve 84, which is connected in the fuel lines 86 leading to the injection nozzles 6. The valve 84 is also electromagnetically actuated.

The electronic control unit 56 contains a logical element with a microprocessor and controls the interlock 48 and the fuel shutoff valve 84 in accordance with the logic chart of FIG. 3.

After the vehicle has been started and when the selector lever 20 is shifted, for example, from the P position to the D position, the logic element of the control unit 56 operates and initially interrogates the brake pedal 22 by way of the switch 60 to determine if the foot brake has been applied. If such is the case, the control unit 56 is reset, that is, neither the interlock 48 nor the valve 84 shutting off the fuel is actuated.

If the foot brake has not been applied, the speed of the internal combustion engine is queried by way of the engine speed sensor 72. If this speed is below 1,000 revolutions per minute, only a slight driving or creep speed torque of the vehicle is involved; the control unit 56 is again reset to the initial state. If the speed n is higher than 3,500 revolutions per minute, a defect is to be assumed in the power control system and the control unit 56 controls the valve 84 to interrupt the delivery of fuel, so that the internal combustion engine is switched off. The program process described in the foregoing is repeated when the vehicle is started again.

In addition, interrogation is made by way of the travel speed sensor 74 to determine whether the vehicle is traveling at a speed higher than 5 kilometers per hour. If such is the case, the control unit is also reset to the initial state.

If the speed n of the internal combustion engine is between 1,000 revolutions per minute and 3,500 revolutions per minute, and if the foot brake 22 or the hand brake 32 has not been applied, the interlock 48 is activated by way of the control unit 56 and the power control unit or the accelerator pedal 34 is blocked. In this process the interlock 48 is energized, the armature element 52 in the drawing is displaced to the right, and the engaging lever 36 is blocked. Power output of the internal combustion engine is thus disabled, because the operator cannot operate the accelerator pedal 34. As soon as the brake pedal 22 or, if necessary, the hand brake 32, is applied, the interlock 48 is again deactivated by the control unit 56 and the control unit 56 is reset to the initial state.

After the control unit 56 has been reset, it remains in its initial state either until the selector lever 20 is again shifted to one of the positions N=neutral or P=park or until the internal combustion engine is restarted.

The logic unit described in the foregoing can also be substantially simplified within the framework of the invention. For example, only the operating brake or foot brake may be used, irrespective of the speed of the speed of the internal combustion engine 12 or the speed of travel of the vehicle. Power output from the internal combustion engine 12 would in this case be possible only if the foot brake 22 were to be applied after the vehicle had been started or the selector lever 20 had been shifted from the N or P position. If desired, only the interlock 48 on the gas pedal 34 or the valve 84 blocking delivery of fuel may be used to disable the power output.

Figure 2:
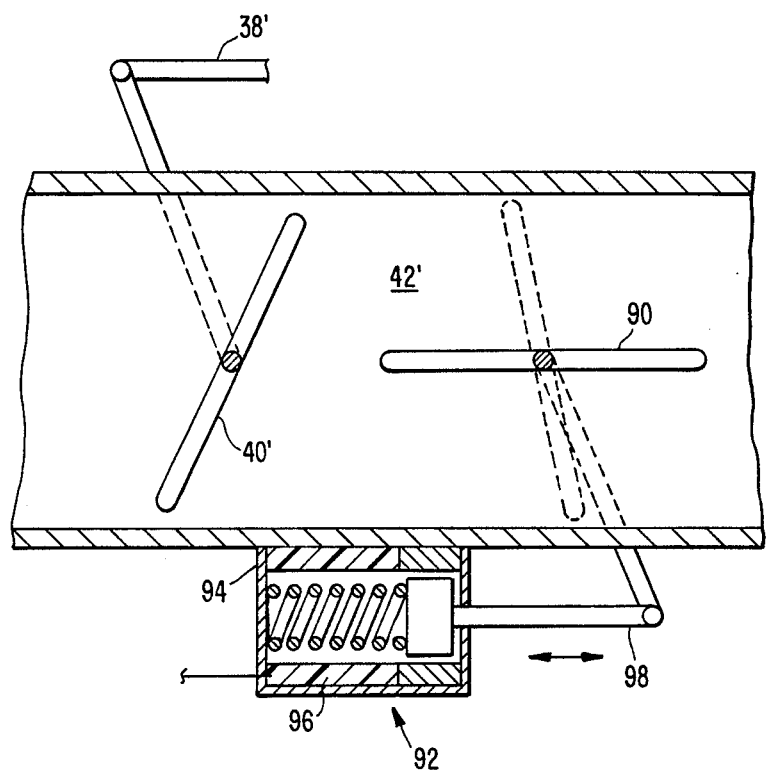
FIG. 2 shows a section of an intake pipe of an internal combustion engine with a second throttle valve for disabling the power output.

FIG. 2 shows another, preferred, alternative for disabling the power output of the internal combustion engine 12. In this instance, there is provided in the intake pipe 42' of the internal combustion engine a second throttle valve 90 that is adjustable from an open position (solid lines) to a closed position (broken lines). The throttle valve 90 may in this case be pivoted into a fully closed position, with the internal combustion engine 12 switched off, or may be pivoted into a position which brings about idling of the internal combustion engine. The electromagnetic actuating element 92, which is made up of a housing 94 with an electric winding 96 and a movable armature element 98, may be controlled by the electronic control unit 56 as shown in FIG. 1, by way of the interlock 48 or the valve 84. For example, if, when the vehicle is started, the selector lever is shifted from the N position to the D position and the foot brake 22 has not been applied, or the conditions set in the program process described in the foregoing have not been fulfilled, the second throttle valve 90 is closed by way of the electromagnetic actuating element 92, and thus the power output of the internal combustion engine 12 is disabled independently of actuation of the first throttle valve 40' by way of the accelerator pedal 34.

Use of a second throttle valve 90 is advantageous especially if the vehicle is equipped, for example, with a slippage control mechanism to prevent drive slippage and accordingly a second throttle valve and a corresponding servomotor have already been provided in place of the electromagnetic actuating element 92 to reduce the power of the internal combustion engine. In this instance the logic unit of the electronic control unit 56 is simply to be integrated into the logic unit of the drive slippage control mechanism, whereby the device claimed for the invention is realized without major additional expense.

A light display on the dashboard, for example, one reading "Apply Brake", may be activated when the interlock 48 is activated or the throttle valve 90 is closed.

The above has been a detailed discussion of the preferred embodiment and should not be construed to unduly limit the full scope of the invention as defined in claims.

What is claimed:

1. An apparatus on a motor vehicle for disabling the power source comprising:
    (a) motor vehicle with a brake and operating means for operating said brake;
    (b) a drive assembly with a drive power source;
    (c) an automatic transmission having a neutral position, a park position, and at least one forward and reverse drive positions;
    (d) a selector means for shifting the automatic transmission from one of said neutral position and said park position to one of said forward and reverse positions;
    (e) control means connected to the brake operating means and the selector means to disable delivery of power from said power source by operating the source in at least one of an idle or stall mode when said selector means is moved to a drive position from one of said neutral and park position unless said brake has been operated by said brake operating means.

2. The apparatus according to claim 1 further comprising a power element, movable between a rest position of nominal power delivery through a number of actuated positions for enhancing power delivery, for controlling the power delivered from said power source, said control means including locking means for locking the power element in said rest position.

3. An apparatus on a motor vehicle for disabling the power source comprising:
    (a) motor vehicle with a brake and operating means for operating said brake;
    (b) a drive assembly with a drive power source;
    (c) an automatic transmission having a neutral positon, a park position, and at least one forward and reverse drive positions;
    (d) a selector means for shifting the automatic transmission from one of said neutral position and said park position to one of said forward and reverse positions;
    (e) control means connected to the brake operating means and the select means to disable delivery of power from said power source when said selector means is moved to a drive position from one of said neutral and park position unless said brake has been operated by said brake operating means; wherein said control means includes at least one valve which interrupts delivery of fuel to said power source.

4. An apparatus on a motor vehicle for disabling the power source comprising:
    (a) motor vehicle with a brake, and operating means for operating said brake;
    (b) a drive assembly with a drive power source;
    (c) an automatic transmission having a neutral position, a park position, and at least one forward and reverse drive positions;
    (d) a selector means for shifting the automatic transmission from one of said neutral position and said park position to one of said forward and reverse positions;
    (e) control means connected to the brake operating means and the selector means to disable delivery of power from said power source when said selector means is moved to a drive position from one of said neutral and park position unless said brake has been operated by said brake operating means; and
    (f) a first throttle for controlling the power delivered from said source and said control means including a second throttle in said air intake system.

5. The apparatus according to claim 1, 3, or 4 wherein said control means are deactivated if said brake means are operated during shifting of the selector means from one of the park and neutral positions.

6. The apparatus according to claim 5 wherein said brake means includes a foot brake and a hand brake; said control means is deactivated when said foot brake is applied during shifting of the selector means from said park position and when said hand brake is applied during shifting of the selector means from said neutral position.

7. An apparatus on a motor vehicle for disabling the power source comprising:
    (a) motor vehicle with a brake and operating means for operating said brake;
    (b) a drive assembly with a drive power source;
    (c) an automatic transmission having a neutral position, a park position, and at least one forward and reverse drive positions;
    (d) a selector means for shifting the automatic transmission from one of said neutral position and said park position to one of said forward and reverse positions;

(e) control means connected to the brake operating means and the selector means to disable delivery of power from said power source when said selector means is moved to a drive position from one of said neutral and park position unless said brake has been operated by said brake operating means; and (f) a vehicle speed detection means for deactivating the means for disabling the power output above a specified threshold speed of the vehicle.

8. An apparatus on a motor vehicle for disabling the power source comprising:
(a) motor vehicle with a brake and operating means for operating said brake;
(b) a drive assembly with a drive power source;
(c) an automatic transmission having a neutral position, a park position, and at least one forward and reverse drive positions;
(d) a selector means for shifting the automatic transmission from one of said neutral position and said park position to one of said forward and reverse positions;
(e) control means connected to the brake operating means and the selector means to disable delivery of power from said power source when said selector means is moved to a drive position from one of said neutral and park position unless said brake has been operated by said brake operating means; and
(f) an engine speed detection means for deactivating the means for disabling the power output below a specified threshold engine speed of the drive power source.

9. An apparatus on a motor vehicle for disabling the power source comprising:
(a) motor vehicle with a brake and operating means for operating said brake;
(b) a drive assembly with a drive power source;
(c) an automatic transmission having a neutral position, a park position, and at least one forward and reverse drive position;
(d) a selector means for shifting the automatic transmission from one of said neutral position and said park position to one of said forward and reverse positions;
(e) control means connected to the brake operating means and the selector means to disable delivery of power from said power source when said selector means is moved to a drive position from one of said neutral and park position unless said brake has been operated by said brake operating means; and
(f) an engine speed detection means for switching off the drive power source above a specified drive power source speed.

10. An apparatus on a motor vehicle for disabling the power source comprising:
(a) brake for braking the wheels of the vehicle;
(b) a foot pedal for operating said brake;
(c) a hand actuator for operating said brake;
(d) an internal combustion engine having an air intake manifold for delivery power;
(e) accelerator means for controlling fuel to said power source;
(f) a drive assembly for delivering power from the engine to said wheels;
(g) an automatic transmission integrated with said engine and said drive assembly to control the delivery of power;
(h) a transmission select lever for shifting the transmission into an from neutral position, park position, reverse position, and forward drive positions;
(i) an electromagnetic interlock fixed relative to said accelerator means;
(j) said interlock having a movable armature element, a spring for holding said armature element in the unenergized state for releasing said accelerator means and in an energized state for maintaining said accelerator means fixed in a fixed position; and
(k) an electric switch for controlling an electric signal to said interlock, said switch cooperating with said interlock, said brake foot pedal, said select lever and said hand actuator for de-energizing said interlock to release said accelerator means when said foot pedal is actuated and when said hand actuator is released before movement of the lever from a neutral or park position to a drive position.

11. The apparatus according to claim 10 further comprising a valve movable between an open and closed position for controlling fuel flow to the power source.

12. The apparatus according to claim 11 further comprising a sensing means for controlling said valve as a function of engine speed wherein at a minimum preselected valve of engine speed said interlock is not actuated even when said foot pedal and hand brake have not been actuated and at a maximum preselected engine speed wherein said valve is moved to a closed position; and if said engine speed is intermediate said maximum and minimum said interlock is energized to prevent actuation of said accelerator means unless brake pedal or hand brake is operated.

13. The apparatus according to claim 12 further comprising means for sensing vehicle speed, cooperating with said electric switch wherein above a preselected speed even if said brake pedal and hand brake are not actuated said interlock will not be energized when said lever is moved from a neutral position.

* * * * *